United States Patent
Nakanishi et al.

(10) Patent No.: US 6,335,121 B1
(45) Date of Patent: Jan. 1, 2002

(54) NEGATIVE ELECTRODE MATERIAL FOR NONAQUEOUS SECONDARY BATTERY

(75) Inventors: Kuniyuki Nakanishi; Nobuyuki Isshiki; Atsushi Suzuki; Yoshio Kajiura, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/101,381

(22) PCT Filed: Nov. 25, 1997

(86) PCT No.: PCT/JP97/04282

§ 371 Date: Jul. 9, 1998

§ 102(e) Date: Jul. 9, 1998

(87) PCT Pub. No.: WO98/24134

PCT Pub. Date: Jun. 4, 1998

(30) Foreign Application Priority Data

Nov. 26, 1996 (JP) ............................................. P08-314791

(51) Int. Cl.⁷ .................................................... H01M 4/58
(52) U.S. Cl. .................................... 429/231.4; 429/231.8; 423/445 R
(58) Field of Search ............................. 429/231.4, 231.8; 423/445, 447.9, 448, 449.6

(56) References Cited

U.S. PATENT DOCUMENTS

| | | | |
|---|---|---|---|
| 5,344,724 A | * 9/1994 | Ozaki et al. ..................... | 429/94 |
| 5,358,802 A | * 10/1994 | Mayer et al. .................. | 429/218 |
| 5,401,598 A | * 3/1995 | Miyabayashi et al. ........ | 429/218 |
| 5,498,493 A | 3/1996 | Dahn et al. | |
| 5,656,394 A | * 8/1997 | Koksbang et al. ............ | 429/218 |
| 5,753,387 A | * 5/1998 | Takami et al. ................ | 429/194 |
| 5,882,621 A | * 3/1999 | Doddapaneni et al. .. | 423/445 R |

FOREIGN PATENT DOCUMENTS

| | | |
|---|---|---|
| JP | 6223433 | 5/1987 |
| JP | 62122066 | 6/1987 |
| JP | 1204361 | 8/1989 |
| JP | 266856 | 3/1990 |
| JP | 4190555 | 7/1992 |
| JP | 5290843 | 11/1993 |
| JP | 831422 A | 2/1996 |

OTHER PUBLICATIONS

Dahn et al., "Carbons and Graphites . . " in Industrial Chemistry Library, vol. 5, G. Pistoia, ed. Elsevier, pp 19–22 (no month), 1994.*

* cited by examiner

*Primary Examiner*—Carol Chaney
(74) *Attorney, Agent, or Firm*—Birch, Stewart, Kolasch & Birch, LLP

(57) ABSTRACT

Disclosed is an electrode material for secondary battery, wherein the discharge capacity is large and the change in potential during the charge/discharge is small. A carbonaceous material, wherein a value of R (degree of raphitization), which is defined as a ratio of a Raman spectrum intensity at 1580 cm$^{-1}$ to a Raman spectrum intensity at 1360 cm$^{-1}$ in the Raman spectrum analysis, is not more than 4.0 and a length of crystallite (Lc) oriented along a crysatllographic c axis obtained by a wide angle X-ray diffraction method is from 25 to 35 nm, of the electrode material is obtained by calcining a material, which can be carbonized by a heat treatment, in the presence of boron nitride or silicon.

4 Claims, No Drawings

NEGATIVE ELECTRODE MATERIAL FOR NONAQUEOUS SECONDARY BATTERY

This application is the national phase under 35 U.S.C. §371 of prior PCT International Application No. PCT/JP97/04282 which has an International filing date of Nov. 25, 1997 which designated the United States of America, the entire contents of which are hereby incorporated by reference.

TECHNICAL FIELD

The present invention relates to an electrode material for non-aqueous secondary battery. More particularly, it relates to an improvement of a negative electrode material of a lithium ion battery.

BACKGROUND ART

Portable appliances have recently been miniaturized and lightened, remarkably. Consequently, miniaturization and lightening of batteries as a power source have remarkably required and various non-aqueous electrolyte solution batteries such as lithium battery have been suggested.

In case of a secondary lithium battery, reduction of the capacity as a result of an irreversible change of lithium (e.g. formation of dendritic lithium, etc.) and a problem on safety arise during repeating of charge/discharge. Therefore, a carbon material is generally used in place of a lithium metal as the negative electrode. As the carbon material, amorphous carbon such as coke (e.g. Japanese Patent Kokai Publication No. 62-122066 and 1-204361), glassy carbon (e.g. Japanese Patent Kokai Publication No. 2-66856) or the like; and graphite such as natural graphite (e.g. Japanese Patent Kokoku Publication No. 62-23433) and manufactured graphite (e.g. Japanese Patent Kokai Publication No. 4-190555) or the like have been suggested.

However, in a secondary lithium ion battery using an amorphous carbon, the discharge capacity of carbon is not sufficient and the potential of the battery changes largely during the charge/discharge. Furthermore, it is necessary to make the potential of carbon during the discharge closer considerably to that of a metal lithium and there is a risk of deposition of a dendritic lithium.

On the other hand, as the method of improving problems such as low charge/discharge capacity, large change in voltage of the battery during the charge/discharge and potential of carbon during the charge, for example, Japanese Patent Kokai Publication No. 3-245458 discloses that the capacity is improved by containing 0.1 to 2.0% by weight of boron in the carbonaceous material, but the problem of large change in voltage during the charge/discharge is still to be solved. Japanese Patent Kokai Publication No. 7-73898 discloses that an improvement in capacity and a change in potential of carbon can be performed by using a material of $B_zC_{1-z}$ (0<z<0.17) made by the chemical vapor deposition method, but the problem of large change in voltage during the charge/discharge is still to be solved. Furthermore, in Japanese Patent Kokai Publication No. 5-290843, the capacity is improved by using a compound wherein a part of carbon atoms constituting a carbon network skeleton of pitch coke is substituted with a boron atom and a nitrogen atom ($BC_3$, $BC_3N$). However, since electrical performances of the compound are similar to those of a semiconductor, overvoltage during the charge/discharge becomes severe and high capacity can not obtained in the practical charge/discharge voltage region. Furthermore, in Japanese Patent Kokai Publication No. 8-31422, a carbon material having high graphitization degree is obtained by heat-treating a combination of pitch coke and a boron compound at the ultra-high temperature, thereby solving the problem on the capacity. However, since $B_4C$ is formed as a result of the heat treatment at the ultra-high temperature (not less than 2500° C.), high capacity can not be obtained.

DISCLOSURE OF THE INVENTION

In a conventional electrode material, a relation between a mechanism of occlusion of lithium, which is related to a charge/discharge capacity, and a crystalline structure of a carbon material has not been elucidated, sufficiently. Hence, an object of the present invention is to elucidate the above mechanism and to provide a carbon material wherein the discharge capacity is large and the change in potential during the charge/discharge is small.

The present inventors have intensively studied to solve the above object. As a result, the present inventors have found that, by using a carbonaceous material, wherein a value of R (degree of graphitization), which is defined as a ratio of a Raman spectrum intensity at 1580 $cm^{-1}$ to a Raman spectrum intensity at 1360 $cm^{-1}$ in the Raman spectrum analysis, is not more than 4.0 and a length of crystallite (Lc) oriented along a crystallographic c axis obtained by a wide angle X-ray diffraction method is from 25 to 35 nm as an electrode of a lithium ion battery, the discharge capacity of the resulting battery is large and the change in potential during the charge/discharge is small.

The fact that "the length of crystallite (Lc) oriented along a crystallographic c axis obtained by a wide angle X-ray diffraction method is from 25 to 35 nm" means that a graphite crystal has grown sufficiently and the safety of the battery is not adversely affected by the gas evolved by overvoltage during the charge/discharge, and that charge/discharge repeating properties are excellent. On the other hand, referring to the degree of graphitization in the Raman spectrum analysis, the small value of R means that a structure containing an amorphous portion, in addition to the graphite crystalline portion, is formed. It should be surprised that the length of crystallite (Lc) oriented along a crystallographic c axis is from 25 to 35 nm and the amorphous portion is contained. Therefore, it is assumed that this structure makes it possible to store at the portion other than the interlaminar portion of crystals, resulting in large discharge capacity.

Accordingly, the present invention provides a negative electrode material for non-aqueous secondary battery, comprising a carbonaceous material wherein a value of R (degree of graphitization), which is defined as a ratio of a Raman spectrum intensity at 1580 $cm^{-1}$ to a Raman spectrum intensity at 1360 $cm^{-1}$ in the Raman spectrum analysis, is not more than 4.0 and a length of crystallite (Lc) oriented along a crystallographic c axis obtained by a wide angle X-ray diffraction method is from 25 to 35 nm.

It has also been found that, since this carbon material has a specific structure comprising a crystalline portion and an amorphous portion, a peak derived from $d_{002}$ in the X-ray diffraction appears between 0.354 nm (second stage) and 0.370 nm (first stage) in the process of charging Li using the carbon material as the negative electrode. It is assumed by this fact that this carbon material extends gradually from the second stage to the first stage without rapidly extending the interlaminar space in the charging process, which means that carbon material is easily charged and the structure is hardly broken by repeating of the charge/discharge.

This carbon material has a dielectric loss (obtained by ESR spectrum analysis) of not more than 0.4. When the dielectric loss is small, the electrical conductivity is high and the material is easily charged and discharged. Therefore, it is specific to the electrode material having an initial charge/discharge capacity of not less than 250 mAh/g.

The carbonaceous material of the present invention can be obtained by calcining an organic material or a carbon material under a non-oxidizing atmosphere at 800 to 3000° C., and preferably from 2000 to 2500° C., in the presence of (a) boron or its compound and (b) silicon or its compound or germanium or its compound. By limiting the kind or amount of the boron material to be added and calcination temperature, formation of $B_4C$ is particularly controlled. When the amount of the boron material is large, by-products, which do not take part in the charge/discharge, are formed, resulting in reduction of the capacity. Accordingly, the present invention provides a negative electrode material for non-aqueous secondary battery, comprising a carbonaceous material obtained by heat-treating under a non-oxidizing atmosphere in the presence of (a) boron or its compound and (b) silicon or its compound or germanium or its compound, wherein a peak derived from $B_4C$ does not appear in the X-ray diffraction pattern, that is, the content of $B_4C$ is about 5% by weight or less.

BEST MODE FOR CARRYING OUT THE INVENTION

The carbonaceous material in the present invention can be produced in the following manner.

The raw material may be any material which can be carbonized by a heat treatment, and specific examples thereof include thermosetting resin such as phenol resin, epoxy resin, unsaturated polyester resin, furan resin, urea resin, melamine resin, alkyd resin, xylene resin or the like, or its blend or modification; condensed polycyclic hydrocarbon compound such as naphthalene, acenaphthylene, phenanthrene, anthracenene, triphenylene, pyrene, chrysene, naphthacene, picene, perylene, pentaphene, pentacene or the like, or its derivative; or a pitch comprising these mixtures as a main component. There can also be used carbon materials such as those carbonized by heat-treating the above organic materials, coke, glassy carbon, graphite and the like.

In the present invention, the above organic materials and carbon materials are preferably heat-treated in the presence of boron or its compound and silicon or its compound or germanium or its compound. Because the presence of them make it possible to form an amorphous portion with promoting the growth of a graphite crystal. This silicon or its compound or germanium or its compound can exert the function by adding a carbon material containing boron or its compound or a material, which can be carbonized by a heat treatment, and calcining the material. When only silicon or its compound or germanium or its compound is added and calcined, high capacity can not be obtained.

Examples of the boron or its compound include boron as a simple substance, boron carbide, boron nitride, boric acid, various borates and the like. Among them, boron nitride is most preferred. The amount of boron or its compound is preferably from 0.1 to 30% by weight, and particularly from 1 to 20% by weight, in terms of boron in the carbonaceous material. When the amount of boron or its compound is smaller than 0.1% by weight, sufficient effect can not be obtained. To the contrary, when the amount of boron or its compound is larger than 30% by weight, a large amount of by-products, which do not take part in charge/discharge, are formed or remained, resulting in reduction of the capacity.

On the other hand, examples of the silicon or its salt include inorganic silicon compound such as silicon as a simple substance, silicon oxide, silicon carbide, silicon nitride or the like; and organic silicon compound such as silicon resin, silicon-containing polymeric compound or the like. Among them, silicon as the simple substance is particularly preferred. Examples of the germanium or its compound include germanium as a simple substance, germanium oxide, germanium carbide, germanium nitride and the like. Among them, germanium as the simple substance is particularly preferred. The amount of silicon or its compound or germanium or its compound is preferably from 0.1 to 10% by weight in terms of silicon or germanium in the carbonaceous material. When the amount of silicon or germanium is smaller than 0.1% by weight, sufficient effect can not be obtained. To the contrary, when the amount of silicon or germanium is larger than 10% by weight, a large amount of silicon carbide, which does not take part in charge/discharge, is formed, resulting in reduction of the capacity.

The heat treatment is performed at the temperature of 800 to 3000° C. under a non-oxidizing atmosphere, e.g. nitrogen or argon atmosphere, etc. When the temperature is particularly from 2000 to 2500° C., an amorphous portion can be formed with efficiently promoting the growth of a graphite crystal. The time of the heat treatment varies depending on the temperature, but is preferably not less than 0.1 hours.

As the binder in case of forming an electrode from the negative material in the present invention, there can be used any publicly known material, which is inert in the battery, such as polytetrafluoroethylene, poly(vinylidene fluoride), polyethylene, polypropylene or the like.

When a non-aqueous secondary lithium ion battery is constructed by using the above carbonaceous material as the negative electrode, any publicly known method can be used. For example, there can be used a method of applying a solution, obtained by dispersing or dissolving a carbonaceous material and a binder in a solvent such as n-methyl-2-pyrrolidone, on a metal foil such as copper foil, drying the coated metal foil and punching to form pieces having a predetermined shape.

As the positive electrode material, there can be used any publicly known material and examples thereof include $Li_xCoO_2$, $Li_xNiO_2$, $MnO_2$, $Li_xMnO_2$, $LiMn_2O_4$, $Li_xCo_yMn_{2-y}O_4$, $\alpha-V_2O_5$, $TiS_2$ and the like.

The non-aqueous electrolyte solution is prepared by appropriately using an organic solvent and an electrolyte in combination. As these organic solvent and electrolyte, there can be used any one that can be used in this kind of a battery, respectively. Examples of the organic solvent include propylene carbonate, ethylene carbonate, vinylene carbonate, dimethyl carbonate, diethyl carbonate, methyl-ethyl carbonate, 1,2-dimethoxyethane, 1,2-dimethoxyethane methylformate, butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, butyronitrile, valeronitrile, benzonitrile, 1,2-dichloroethane, 4-methyl-2-pentanone, 1,4-dioxane, anisole, diglyme [$(CH_3OCH_2CH_2)_2O$], dimethylformamide, dimethyl sulfoxide and the like. These solvents can be used alone or in combination thereof. Examples of the electrolyte include $LiClO_4$, $LiAsF_6$, $LiPF_6$, $LiBF_4$, $LiB(C_6H_5)_4$, $LiCl$, $LiBr$, $LiI$, $CH_3SO_3Li$, $CF_3SO_3Li$, $LiAlCl_4$ and the like. These electrolytes can be used alone or in combination thereof.

The following Examples further illustrate the present invention in details but are not to be construed to limit the scope thereof. In the following Examples, "%'s" are by weight unless otherwise stated.

EXAMPLE 1

1360 g of furfuryl alcohol and 1140 g of 92% paraformaldehyde were dissolved with stirring at 80° C., and a liquid mixture of 1430 g of phenol, 22 g of potassium hydroxide and 120 g of water was added dropwise under stirring. After the completion of the dropwise addition, the mixture was reacted at 80° C. for 3 hours. Then, a mixed solution of 220 g of phenol, 22 g of potassium hydroxide and 120 g of water was further added, followed by reaction at 80° C. for 3 hours. After cooling to 30° C., 1100 g of furfuryl alcohol was added. Then, the solution was neutralized with phosphoric acid to precipitate a metal salt. The neutralized solution was dehydrated at 60° C. under reduced pressure to remove water, thereby setting the water content to a fixed value. A filter aid was added and the inorganic salt precipitated in the synthesized resin was removed by filtering through a membrane filter of 0.1 $\mu$m in pore diameter.

After a fixed amount of the thermosetting resin thus obtained was weighed, 10% boron nitride and 0.5% silicon powder were added and the mixture was uniformly kneaded by using a stirrer and then cured at 80° C. for 3 days to obtain an uncalcined raw material.

This resin was heated to 800° C. at a heating rate of 100° C./hour under a nitrogen atmosphere and maintained at 800° C. for 3 hours. After the nitrogen atmosphere is replaced by an argon atmosphere, the resin was heated to 2200° C. at a heating rate of 300° C./hour, maintained at 2200° C. for 3 hours and cooled to room temperature. This sample was ground by using a vibration mill and classified by using a sieve to obtain a carbon powder material having an average particle diameter of 10 $\mu$m (measured by using a laser diffraction type particle size measuring device, Model LA-500, manufactured by Horiba Seisakusho Co., Ltd.).

In order to confirm performances as a negative electrode material, the following electrode was made by using the carbon material having such a particle diameter, first. Then, charge/discharge characteristics were confirmed.

To 90 g of a powdered carbon material, 10 g of poly(vinylidene fluoride) as a binder was added. Using n-methyl-2-pyrrolidone, the mixture was formed into a paste and a part of the paste was applied on a stainless steel and adhered under the pressure of 1 t/cm$^2$. After drying, pieces having a fixed size were punched from the coated stainless steel and each of them was used as a negative electrode.

A metal lithium was used as the material of a counter electrode.

A fixed amount of an electrolyte solution prepared by adding 1 mol/l of LiPF$_6$ to an ethylene carbonate/dimethylcarbonate mixed solvent (volume ratio 1:1) was added and the evaluation was performed. The measuring conditions were set to a current density of 2 mA/cm$^2$ and a voltage of 25 mV to 1500 mV from more practical point of view. The results are shown in Table 1.

EXAMPLE 2

After a fixed amount of a coal tar pitch as a raw material was weighed in place of the thermosetting resin in Example 1, 6% boron nitride and 1% silicon were added and the mixture was uniformly kneaded by using a stirrer to obtain an uncalcined raw material. According to the same manner as that described in Example 1 except that this raw material was used and the calcination temperature was adjusted to 230° C., the raw material was calcined to make an electrode and characteristics of the resulting battery were evaluated. The results are shown in Table 1.

EXAMPLE 3

After a fixed amount of a coal tar pitch as a raw material was weighed in place of the thermosetting resin in Example 1, 6% boron nitride and 3% silicon were added and the mixture was uniformly kneaded by using a stirrer to obtain an uncalcined raw material. According to the same manner as that described in Example 1 except that this raw material was used and the calcination temperature was adjusted to 2400° C., the raw material was calcined to make an electrode and characteristics of the resulting battery were evaluated. The results are shown in Table 1.

EXAMPLE 4

After a fixed amount of a coal tar pitch as a raw material was weighed in place of the thermosetting resin in Example 1, 6% boron nitride and 1% germanium were added and the mixture was uniformly kneaded by using a stirrer to obtain an uncalcined raw material. According to the same manner as that described in Example 1 except that this raw material was used and the calcination temperature was adjusted to 2200° C., the raw material was calcined to make an electrode and characteristics of the resulting battery were evaluated. The results are shown in Table 1.

EXAMPLE 5

After performances of the carbon raw material of Example 2 as a negative electrode material were confirmed, the following coin battery was made by using LiCoO$_2$ as a positive electrode and its characteristics were confirmed. To 90 g of a powdered carbon material, 10 g of poly(vinylidene fluoride) as a binder was added. Using n-methyl-2-pyrrolidone, the mixture was formed into a paste and a part of the paste was applied on a stainless steel and fixed under the pressure of 1 t/cm$^2$. After drying, pieces having a fixed size were punched from the coated stainless steel and each of them was used as a negative electrode.

On the other hand, a positive electrode was made in the form of a disc by charging a part of a mixture of 88 g of LiCoO$_2$, 6 g of acetylene black and 6 g of a polytetrafluoroethylene resin in a mold and molding the mixture under the pressure of 1 t/cm$^2$. Using an electrolyte solution prepared by adding 1 mol/l of LiPF$_6$ to an ethylene carbonate/dimethylcarbonate mixed solvent (volume ratio 1:1), a coin type battery was made and performances of the battery was examined. The resulting battery was charged to 4.2 V at the current density of 2.0 mA/cm$^2$ and discharged to 2.5 V. At this time, the charge/discharge capacity was evaluated. The results are shown in Table 1.

Comparative Example 1

After a fixed amount of a coal tar pitch as a raw material was weighed in place of the thermosetting resin in Example 1, boron and silicone were not added and the mixture was uniformly kneaded by using a stirrer to obtain an uncalcined raw material. According to the same manner as that described in Example 1 except that the calcination temperature was adjusted to 2300° C., the raw material was calcined to make an electrode and characteristics of the resulting battery were evaluated. The results are shown in Table 1.

Comparative Example 2

After a fixed amount of the thermosetting resin in Example 1 was weighed, only the thermosetting resin was used as a raw material to obtain an uncalcined raw material. According to the same manner as that described in Example 1 except the calcination temperature was adjusted to 2400° C., the raw material was calcined to make an electrode and characteristics of the resulting battery were evaluated. The results are shown in Table 1.

Comparative Example 3

After a fixed amount of a coal tar pitch as a raw material was weighed, only 5% boron nitride was added and the mixture was uniformly kneaded by using a stirrer to obtain an uncalcined raw material. According to the same manner as that described in Example 1 except that the calcination temperature was adjusted to 1200° C., the raw material was calcined to make an electrode and characteristics of the resulting battery were evaluated. The results are shown in Table 1.

TABLE 1

| | Raw material | Amount of boron nitride (%) | Amount of silicon (%) | Calcination temperature (° C.) | Raman spectrum 1580 cm$^{-1}$/1360 cm$^{-1}$ | L(A) Lc(nm) | Discharge capacity (mAh/g) | Efficiency (%) |
|---|---|---|---|---|---|---|---|---|
| Example 1 | Thermosetting resin | 10 | 0.5 | 2200 | 2.1 | 26 | 280 | 85 |
| Example 2 | Pitch | 6 | 1 | 2300 | 2.4 | 27 | 290 | 85 |
| Example 3 | Pitch | 6 | 3 | 2400 | 2.6 | 28 | 290 | 87 |
| Example 4 | Pitch | 6 | 1(Ge) | 2200 | 2.6 | 27 | 290 | 87 |
| Example 5 | Pitch | 6 | 1 | 2300 | 2.4 | 27 | 295 | 87 |
| Comp. Example 1 | Pitch | 0 | 0 | 2300 | 5.3 | 26 | 150 | 80 |
| Comp. Example 2 | Thermosetting resin | 0 | 0 | 2400 | 2.8 | 10 | 80 | 70 |
| Comp. Example 3 | Thermosetting resin | 5 | 0 | 1200 | 1.8 | 18 | 170 | 80 |
| Comp. Example 4 | Thermosetting resin | 0 | 5 | 2400 | 3.7 | 12 | 100 | 75 |

What is claimed is:

1. A negative electrode material for a non-aqueous secondary battery, comprising a carbonaceous material,
   wherein a value of R (degree of graphitization) being defined as a ratio of a Raman spectrum intensity at 1580 cm$^{-1}$ to a Raman spectrum intensity at 1360 cm$^{-1}$ in the Raman spectrum analysis is not more than 4.0,
   a length of crystallite (Lc) oriented along a crystallographic c axis obtained by a wide angle X-ray diffraction method is from 25 to 35 nm, and the carbonaceous material contains 1 to 20% by weight of boron and 0.1 to 10% by weight of silicon or germanium.

2. The negative electrode material according to claim 1, wherein the content of boron is from 1 to 20% by weight and the content of silicon or germanium is from 0.1 to 10% by weight.

3. The negative electrode material according to claim 2, wherein the content of B$_4$C is 5% by weight or less.

4. A method of producing a negative electrode material for a non-aqueous secondary battery, said negative electrode comprising a carbonaceous material containing 1 to 20% by weight of boron and 0.1 to 10% by weight of silicon or germanium in the reactant mixture, said method comprising the step of calcining a material which can be carbonized by a heat treatment, or a carbon material under a non-oxidizing atmosphere at 2000 to 2500° C. in the presence of boron nitride and silicon or germanium, wherein a weight percentage of silicon or germanium is not greater than the weight percentage of boron nitride in terms of boron.

* * * * *